Aug. 20, 1968  G. E. MOORE  3,397,589
GEAR TRAIN ASSEMBLIES
Filed April 28, 1967  5 Sheets-Sheet 1
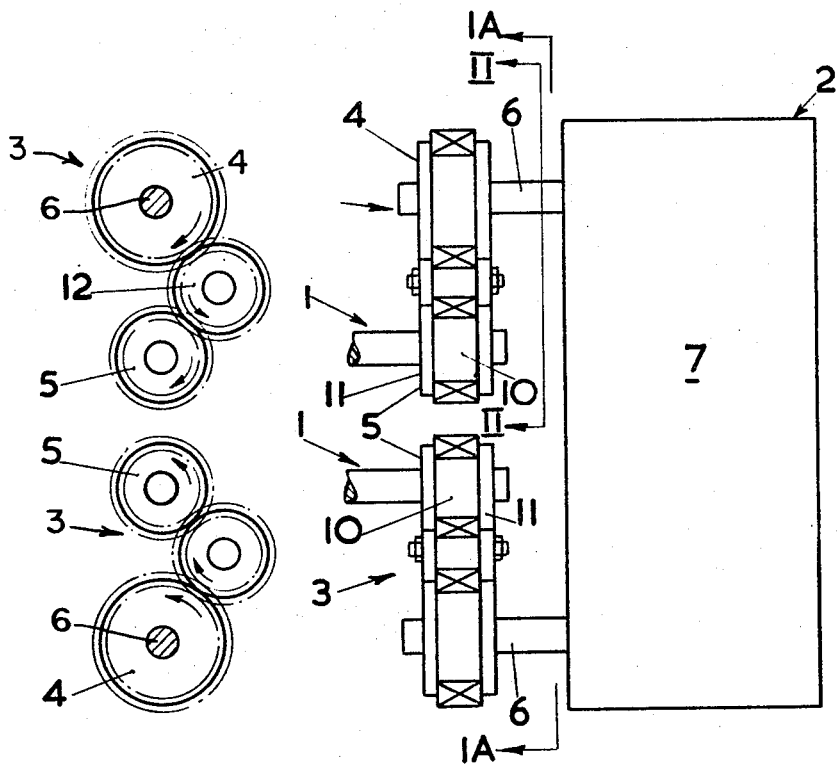
FIG. IA.   FIG. I.
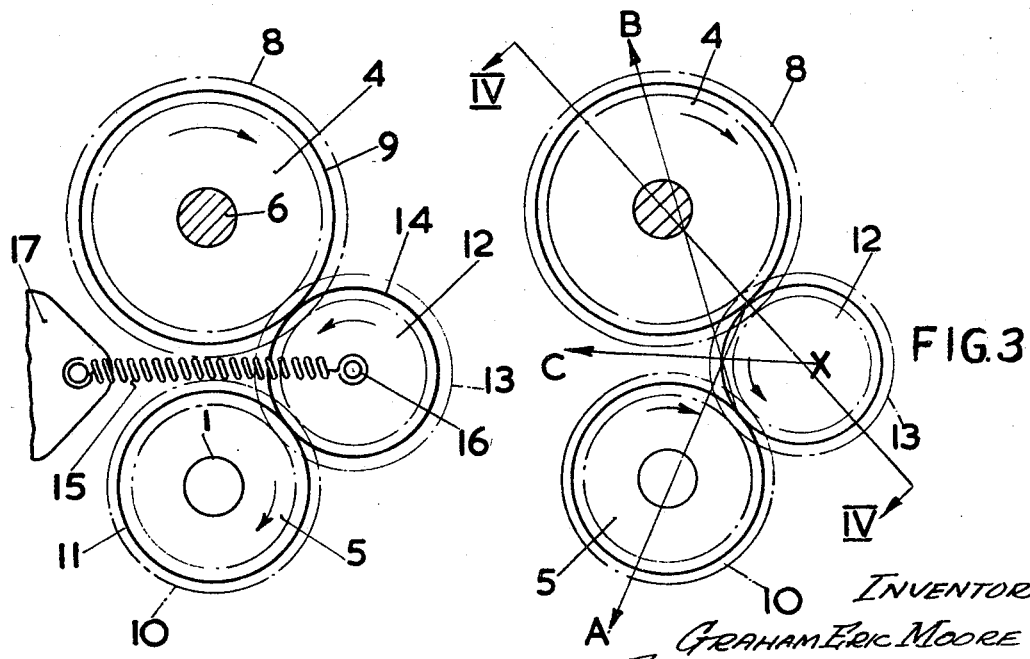
FIG. 2.
INVENTOR
GRAHAM ERIC MOORE
By
Cushman, Darby & Cushman
ATTORNEYS Aug. 20, 1968    G. E. MOORE    3,397,589

GEAR TRAIN ASSEMBLIES

Filed April 28, 1967    5 Sheets-Sheet 2

INVENTOR
GRAHAM ERIC MOORE
BY Cushman Darby & Cushman
ATTORNEYS

Aug. 20, 1968   G. E. MOORE   3,397,589
GEAR TRAIN ASSEMBLIES

Filed April 28, 1967   5 Sheets-Sheet 3

INVENTOR
GRAHAM ERIC MOORE
By
Cushman, Darby & Cushman
ATTORNEYS

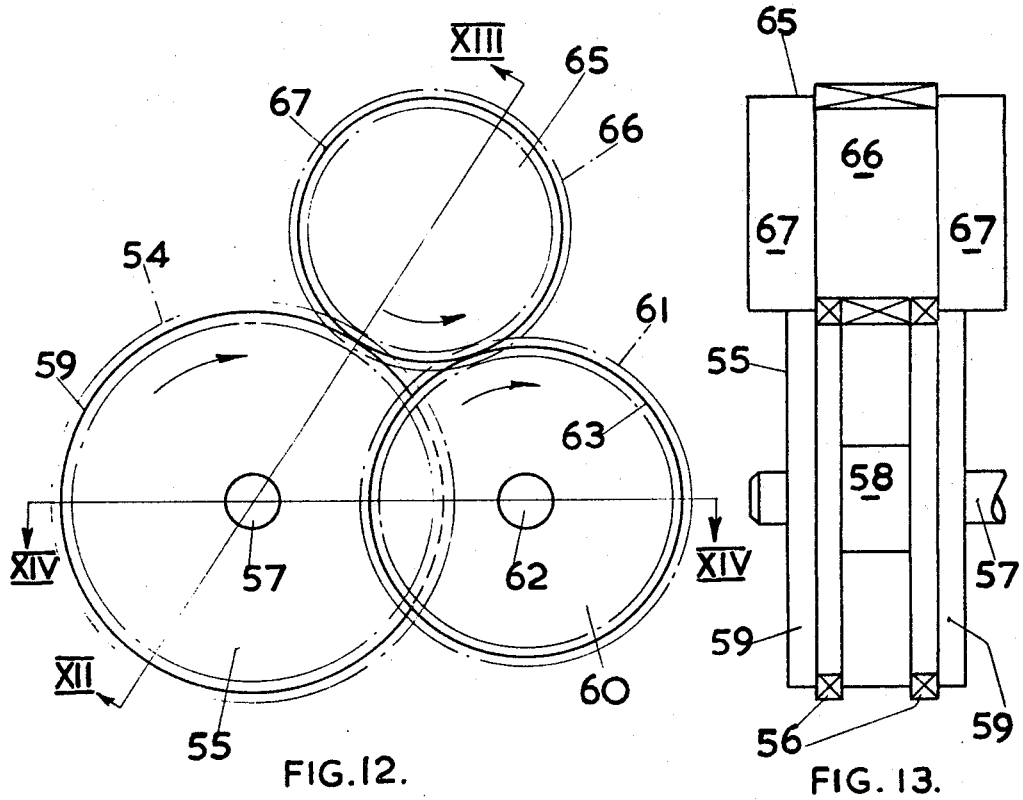
FIG. 12.
FIG. 13.
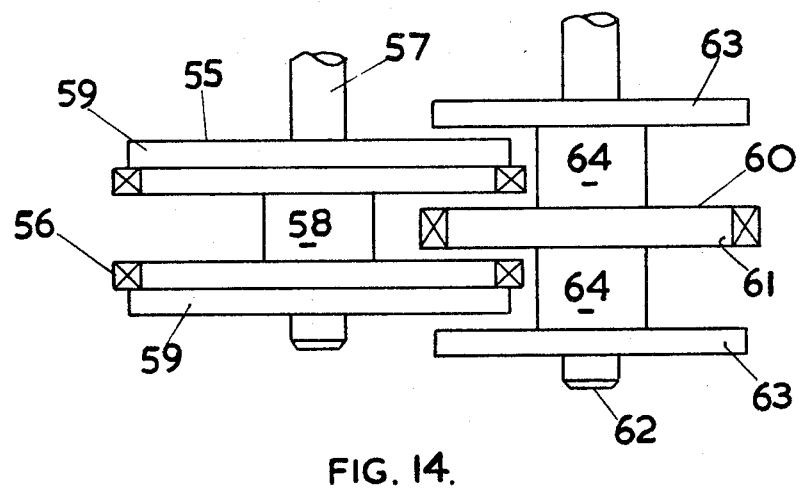
FIG. 14.

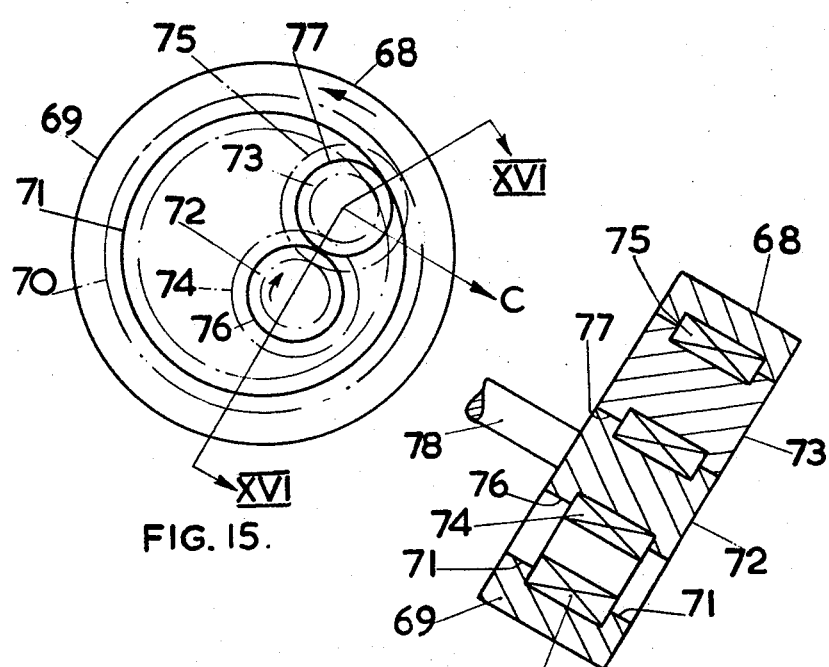
FIG. 15.
FIG. 16.
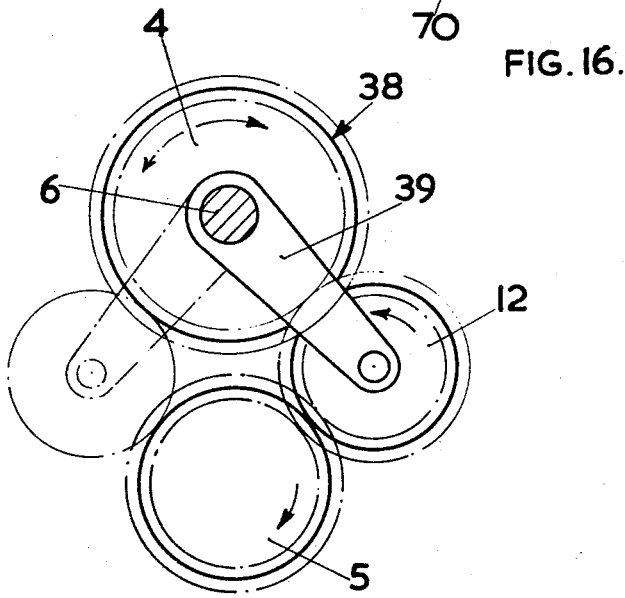
FIG. 10.
INVENTOR
GRAHAM EIRC MOORE

United States Patent Office 3,397,589
Patented Aug. 20, 1968

3,397,589
GEAR TRAIN ASSEMBLIES
Graham Eric Moore, Four Oaks, Sutton Coldfield, England, assignor to Imperial Metal Industries (Kynoch) Limited, Witton, Birmingham, England, a corporation of Great Britain
Filed Apr. 28, 1967, Ser. No. 634,625
Claims priority, application Great Britain, May 23, 1966, 22,873/66
14 Claims. (Cl. 74—397)

ABSTRACT OF THE DISCLOSURE

A gear train assembly of driving, driven and idler gears, the idler gear being movable radially of the other gears, and the gears having cylindrical spacers to locate them in correct mesh and being relatively disposed so that during driving of the gears, a resultant driving force acts upon the idler gear in a direction between the other gears to urge and hold the idler gear in correct mesh with the other gears.

BACKGROUND OF THE INVENTION (1) *Field of the invention*

This invention relates to gear train assemblies.

(2) *Description of prior art*

In some known gear train assemblies in which a driving gear wheel and a driven gear wheel are required to rotate in the same direction, an idler gear wheel is used to transmit the drive from the driving to the driven gear wheel. In such assemblies when the driving and driven gear ratios are changed by replacement of one of the gear wheels with one of a different pitch circle diameter, the idler gear wheel then needs careful and accurate repositioning to place it correctly in mesh with the driving and driven gear wheels. As is known, the idler gear wheel is correctly in mesh with each of the other gear wheels when its pitch circle contacts the pitch circle of the other gear at a common tangential point. It is found to be very difficult in practice to place the idler gear wheel in mesh with the driving and driven gear wheels and if the gear wheels are located in positions in which they are incorrectly in mesh, this situation may lead to more rapid gear tooth wear and also to additional and increased loading on the gear bearings.

To avoid the above disadvantages, a gear train assembly may be replaced by a sprocket and chain assembly which comprises a driven sprocket and driving sprocket which are rotated in the same direction by an endless chain lying in driving engagement with the teeth of both sprockets, the chain being tensioned by a chain tensioning device. A sprocket and chain assembly is, however, more cumbersome than a gear train assembly. A further disadvantage found when it is required to replace one of the sprockets is that it is necessary to untension the chain and then to remove it before the sprocket can be removed and after the replacement sprocket has been fitted, it is necessary to replace the chain and then to retension it.

SUMMARY OF THE INVENTION

According to the present invention, a gear train assembly comprises a driving and driven gear wheel units, and an idler gear wheel unit for drivably connecting the driving and driven units, the idler unit being movable radially with respect to one at least of the other units, and each of the units comprises a gear wheel element and at least one coaxial cylindrical spacer, the or each spacer of the idler unit lying in engagement with the spacers of the other units when gear teeth of the idler unit are in correct mesh with those of the other units, and with the teeth of the units in correct mesh, the relative disposition of the units is such that when the driving unit is rotated in one direction to drive the driven unit, a resultant force of the driving forces applied to the teeth of the idler unit acts along a path between the rotational centres of the other units so as to hold the teeth of the idler unit constantly in correct mesh with the teeth of the other units.

It is clear to the applicants that the relative disposition of the units is an important consideration in the invention. In practice, it is found that if all of the units have external gear teeth then the units should be relatively disposed so that when the idler unit teeth are in correct mesh with the teeth of the other units, the angle produced between one line connecting rotational centres of the idler unit and the driving unit and another line connecting the rotational centres of the idler unit and the driven unit is at least twice the pressure angle of the assembly. On the other hand, one of the driving and driven units may be an annular unit with internal gear teeth. In this case, the angle produced between a line connecting the rotational centres of the idler unit and the non-annular driving or driven unit and an extension of another line connecting rotational centres of the idler unit and the annular unit is at least twice the pressure angle. The term "pressure angle" is used in its normal accepted sense in the gear manufacturing art.

Further, the term "correct mesh" as referred to above and throughout the specification indicates the normal meshing of the teeth of the idler unit with those of each of the other units when the pitch circles of the units contact at a single common tangential point.

According to another aspect of the invention, a gear train assembly comprises a driving and driven gear wheel units, the distance between the rotational centres of the driving and driven units being variable, and an idler gear wheel unit for drivably connecting the driving and driven units, the idler unit being movable radially with respect to one at least of the other units, and each of the units comprises a gear wheel element and at least one coaxial cylindrical spacer, the or each spacer of the idler unit lying in engagement with the spacers of the other units when gear teeth of the idler unit are in correct mesh with those of the other units, and with the teeth of the units in correct mesh, the relative disposition of the units is such that when the driving unit is rotated in one direction to drive the driven unit, a resultant force of the driving forces applied to the teeth of the idler unit acts along a path between the rotational centres of the other units so as to hold the teeth of the idler unit constantly in correct mesh with the teeth of the other units.

According to yet a further aspect of the invention, a gear train assembly comprises driving and driven gear wheel units, and first and second idler gear wheel units disposed one on each side of a line connecting the rotational centres of the driving and driven units, each idler unit being movable radially with respect to one at least of the driving and driven units, each of the units comprising a gear wheel element and at least one coaxial cylindrical spacer with the or each spacer of each idler unit lying in engagement with the spacers of the driving and driven units when gear teeth of the idler unit are in correct mesh with those of the driving and driven units, and with the teeth of the first or second idler unit in correct mesh with teeth of the driving and driven units, the relative disposition of the units is such that when the driving unit is rotated, respectively, in one direction or in the opposite direction to drive the driven unit, a resultant force of the driving forces applied to the gear teeth of the first or second idler unit, as the case may be, acts along a path between the rotational centres of the driven and driving units so as to hold the teeth of the idler unit constantly in correct mesh with teeth of the other units, means being provided for preventing or restricting movement of the teeth of each idler unit out of correct mesh with those of the driving unit when said resultant force is not applied along said path.

In an assembly according to the invention, at least one unit may comprise two spacers located one on each side of the gear wheel elements. Alternatively, or in addition, in at least one unit, the gear wheel element may comprise two coaxially spaced-apart gears between which is disposed at least one spacer.

It is preferable that in each unit, the or each spacer has a diameter substantially equal to the pitch circle diameter of the unit.

BRIEF DESCRIPTION OF THE DRAWINGS

Embodiments of the invention will now be described, by way of example, with reference to the accompanying drawings in which:

FIGURE 1 is a front elevational view of a drive arrangement for a rolling mill, the drive arrangement including two gear train assemblies according to the invention;

FIGURE 1A is a cross-sectional view along line IA—IA in FIGURE 1 showing diagrammatically the gear train assemblies;

FIGURE 2 is on a larger scale than FIGURE 1 and is a cross-sectional view, along line II—II in FIGURE 1, of one of the assemblies illustrated diagrammatically;

FIGURE 3 is a view similar to FIGURE 2 of the gear train assembly indicating the manner in which the assembly operates in practice;

FIGURE 10 is a view similar to FIGURE 2 of a third embodiment showing different relative positions of units of a reversible gear train assembly;

FIGURE 12 is a view similar to FIGURE 11 of a fifth embodiment;

FIGURES 13 and 14 are cross-sectional views, respectively, along lines XIII—XIII and XIV—XIV in FIGURE 12;

FIGURE 15 is a diagrammatic axial end view of a gear train assembly forming a sixth embodiment;

FIGURE 16 is a cross-sectional view along line XVI—XVI in FIGURE 14.

DESCRIPTION OF THE PREFERRED EMBODIMENTS

Figure 4:
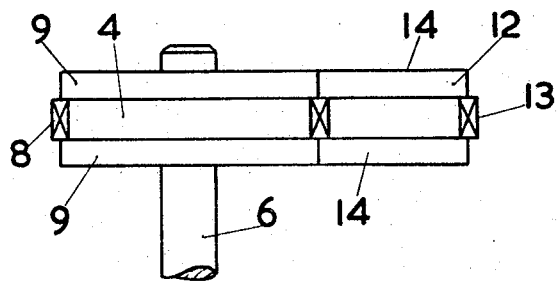
FIGURE 4 is a cross-sectional view on line IV—IV of the gear train assembly of FIGURE 3.

In the following embodiments and modifications thereof, parts identical to one another bear identical reference numerals.

In a first embodiment, shown in FIGURES 1 to 4, a rolling mill comprises two roll drive shafts 1 drivably connected to two mill rolls (not shown) of conventional design for providing a nip for reducing the thickness of metal strip fed therethrough. It is desirable to be able automatically to adjust the positions of the work roll centres during operation of the mill to maintain the thickness of rolled strip between specific limits. To allow for this adjustment a drive arrangement 2 is used as will now be described.

The drive arrangement 2 comprises two gear train assemblies 3 according to the invention. Each assembly 3 as shown in FIGURES 2, 3 and 4 comprises a driving gear wheel unit 4 and driven gear wheel unit 5. The gear unit 4 is coaxially secured to a fixed driving shaft 6 which extends from a main drive box 7, the main drive box ensuring that the two shafts are driven in opposite direction with equal angular velocities. The unit 5 of each assembly is coaxially secured to a drive shaft 1. As is particularly shown in FIGURE 4, the driving unit 4 comprises a gear wheel element which is a single gear wheel 8 integrally formed with coaxial cylindrical spacers 9 located one on each side of the gear wheel. The driven unit 5 is similarly formed with a gear wheel 10 having integral spacers 11 (FIGURES 1 and 2). An idler unit 12 comprises a gear wheel 13 with integral coaxial spacers 14 located one at each side.

Each of the spacers has a diameter equal to the pitch circle diameter of its respective gear wheel and the teeth of the gear wheel 13 lie in correct mesh with the teeth of the gear wheels 8 and 10 when the peripheral surfaces of the spacers 14 lie in engagement with the peripheral surfaces of the spacers 9 and 11.

The three units of each assembly are relatively disposed so that when the gear wheels are in correct mesh, two lines extending one between the rotational centres of units 4 and 12 and the other between rotational centres of units 5 and 12 produce between them an angle which is at least twice the pressure angle of the gear wheels. Movement prevention or restriction means, i.e. resilient means in the form of two tension springs 15 are used one on each side of each idler unit to hold the idler gear wheel in continuous correct meshing engagement with the other gear wheels. Each spring extends from a sleeve 16 rotatable upon a short shaft of the idler unit to a fixed bracket 17. For reasons to be explained, however, the spring is unnecessary to retain the idler gear wheel in this position during gear wheel rotation, although the idler unit is not mounted upon a shaft fixed relative to the other units and is movable radially of the other gears.

In use of the mill, the driving shafts 6 are driven by the drive box 7 to rotate the driving units 4. In each assembly 3, the idler unit is driven to drive the driven unit by virtue of the meshing engagement of the gear wheels 8 and 13 and gear wheels 13 and 10. Each unit 4 is rotated in a direction so that each portion of the unit moves into the space between units 4 and 5 as it moves away from the idler unit. For the upper assembly 3, rotational arrows in FIGURES 2 and 3 indicate the directional movement of the units. During rotation of each unit 4 in this direction, a force in the direction of arrow A (FIGURE 3) is applied to the teeth of gear wheel 13 by the teeth of gear wheel 8. Also, as the gear wheel 13 drives the gear wheel 10, a force is applied to the teeth of gear wheel 13 by the gear wheel 10 in the direction of arrow B. Because of the relative disposition of the units referred to above, the resultant force C of these two forces acts upon the idler unit 12 along a path between the centres of rotation of the units 4 and 5, as shown in FIGURE 3, so as to hold the idler unit with its spacers 14 in continuous engagement with the spacers 9 and 11 whereby the teeth of gear wheel 13 are held in constant and correct mesh with the teeth of the other gear wheels during rotation of the units in the directions indicated.

With this assembly arrangement, provided the relative disposition of the units, i.e. their angular relationship with regard to the pressure angle, is maintained as explained above, each of the units 5 may be moved towards and away from its unit 4 during gear wheel rotation as this merely results in a consequent and corresponding movement of the idler unit while its teeth are maintained in correct mesh with those of the other units. It will be appreciated that this allowance for movement of the units 5 permits the work roll nip to be adjusted while metal strip is being reduced in thickness to maintain the reduced thickness between specified limits If it is required in each assembly to replace one of the units 4, 5 and 12 with a unit of different gear wheel pitch circle diameter to alter the driven speeds of the work rolls, it is a simple matter to remove the idler unit 12 to allow for this replacement. Further, when a replacement unit has been added, there is no need for manual adjustment in position of the idler unit to ensure that the gear wheel 13 correctly meshes with the other gear wheels, because correct gear wheel meshing is always ensured, then no rotation of the driving unit in the direction indicated by virtue of the resultant force C acting upon the idler unit.

An additional advantage obtained with each gear train assembly described above is that the idler gear wheel will always lie in correct mesh with the other gear wheels despite shaft deflections or wear in the shaft bearings, as any radial displacement of the axes of rotation of the other units during use is accommodated by automatic corresponding movement of the idler unit. Further, as correct gear wheel meshing is always ensured, then no wear of the gears can take place caused by incorrect meshing. Moreover, a fixed mounting shaft and bearing for the idler unit is not used.

In the above described embodiment, with the use of the springs 15, each gear train assembly may be used successfully in any position of the gear wheel units with the rotational axes horizontal. For instance, if the units 4 and 5 are located horizontally spaced-apart, instead of vertically spaced-apart, with unit 12 located beneath units 4 and 5, then unit 12 would be retained in place by the springs when the assembly is not in use.

However, in a modification of the above embodiment in which in each gear train assembly the units 4 and 5 are horizontally spaced-apart, the gear wheel 13 lies in mesh with the other gear wheels with the unit 12 located above the other units. In this case, the springs 15 are dispensed with and the unit 12 is automatically held with wheel 13 in mesh with the other gear wheels when the assembly is not in use, by virtue of the weight of the unit 12.

Figure 5:
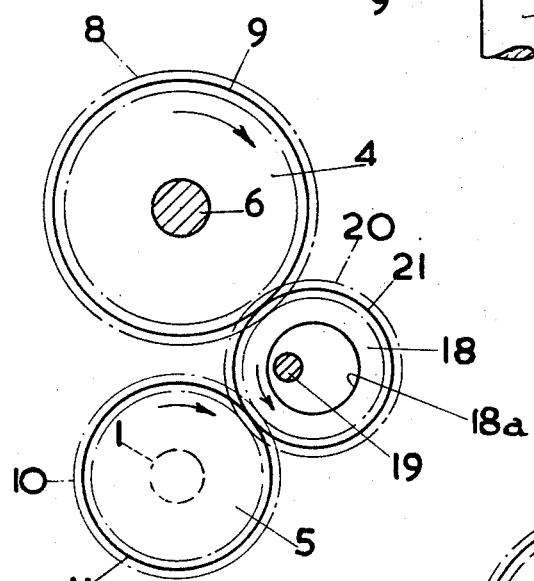
FIGURES 5, 6 and 7 are views similar to FIGURE 2 of modifications of the first embodiment.

In a modification of the first embodiment as shown in FIGURE 5, the idler unit, the springs 15 and bracket 17 are replaced by an annular idler unit 18 and a movement restricting means in the form of an abutment member or peg 19. The unit 18 is provided with a gear wheel 20 and spacers 21 similar to those of the unit 12 of the first embodiment. The abutment peg is secured at one end to a casing of the main drive box 7 and extends radially and axially within the annulus as shown in FIGURE 5.

When the gear wheel 20 is in correct mesh with the gear wheels 8 and 10, the peg is spaced slightly from the inner surface 18a of the unit 18. However, when the resultant force C is not being applied to the unit 18 such as occurs when the gears are not being driven or during braking of the gears when a resultant force in the reverse direction may be imposed upon unit 18, any movement of the unit 18 out of correct mesh with the other units is restricted by engagement of the peg by the inner surface of the unit. The peg is so positioned that it stops movement of the unit 18 out of correct mesh before the teeth of the gear wheel 20 are completely disengaged from those of the gear wheel 8. Hence, when the resultant force is again applied to unit 18 during the next application of drive from the driving to the driven units, this force urges the unit 18 into its position of correct tooth mesh with the other units.

Figure 6:
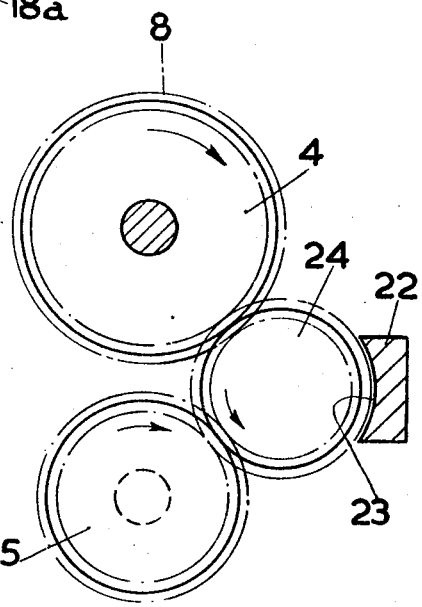

In another modification of the first embodiment shown in FIGURE 6, the springs 15 and bracket 17 are replaced by a restricting means in the form of an abutment member. This abutment member is a shoe 22 held in fixed position upon the casing of the main drive box 7 and is spaced slightly from the idler unit 24 when the teeth of the unit are correctly meshed with those of the other unit. The unit 24 differs from the unit 12 in that it has no short shaft with a sleeve 16 mounted thereon. A surface 23 of the shoe opposing the unit 24 is of concave shape to engage the unit should this move out of correct tooth mesh with the other units in circumstances outlined in the last preceding paragraph. The shoe prevents insufficient movement of the unit 24 to allow for complete disengagement of its gear teeth from those of the gear wheel 8 so that the unit 24 is returned to correct tooth mesh when the resultant force C is next applied.

Figure 7:
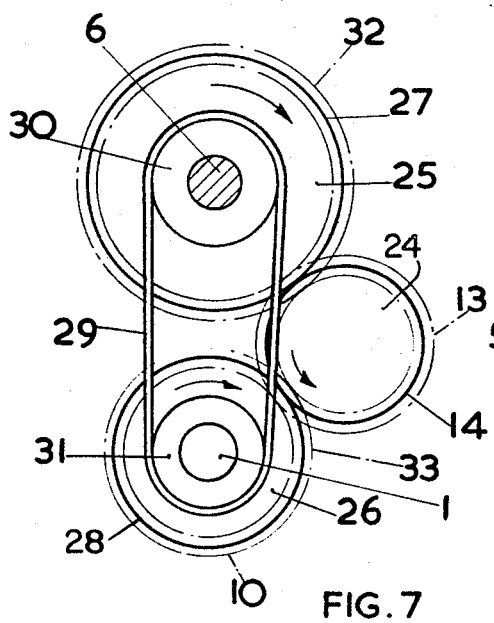

In yet a further modification of the first embodiment shown in FIGURE 7, in each gear train assembly, a driving unit 25 is drivably connected to a driven unit 26 by the idler unit 24. The units 25 and 26 have cylindrical spacers 27 and 28 to engage the spacers 14 of unit 24 when the gear wheels of the units are in correct mesh.

In this construction, an idler unit movement preventing or restricting means comprises an endless member in the form of a belt 29 which extends in frictional contact around a belt engaging surface of each unit 25 and 26, this surface being the peripheral surface of an integral cylindrical coaxial extension 30 and 31, respectively, of units 25 and 26.

When the resultant force C is not applied, frictional engagement of the belt with the surfaces of extensions 30 and 31 prevents rotational slippage of one of the units 25 and 26 relative to the other. In consequence, the idler unit is held with its teeth in correct mesh with those of the other units by virtue of the fact that the teeth of gear wheels 32 and 33 of units 25 and 26 lock the gear wheel 13 in position and prevent disengagement of the teeth.

In the following embodiments two to five inclusive, it is to be understood that the driving, driven and idler units are relatively disposed in the manner specified in the first embodiment.

In a second embodiment, a rolling mill is constructed in the manner described in the first embodiment with a drive arrangement for allowing for automatic adjustment of work roll centre distances. In this embodiment, however, it is required that the work rolls are reversible in their direction of rotation to permit metal strip after being reduced in thickness on a first pass through the mill to be further reduced in thickness on a second pass in the reverse direction. To permit this, each gear train assembly 34 (one of which is shown in FIGURES 8 and 9) is of different construction from the assemblies 3 of the first embodiment.

Each gear train assembly 34 comprises, as in the first embodiment, a driving unit 4 and driven unit 5, each with its respective gear wheels 8 and 10 and spacers 9 and 11 as described in the first embodiment. However, each assembly 34 also comprises two idler units 12 disposed one on each side of a line connecting the rotational centres of the driving and driven units.

Means are provided upon each assembly for preventing or restricting movement of each idler unit to move its teeth out of correct mesh with the driving unit. This means comprises a bellcrank lever 35 which is pivotally mounted at the junction of its arms 36 and 37 upon the shaft 6. The lever is frictionally connected to the driving unit by sufficient frictional engagement of the lever with the shaft to tend to urge the lever in the same direction of rotation of the shaft. The relative positions of the idler units 12 is such that when one of the units lies in correct mesh with both the driven and driving units, the other idler unit is completely out of engagement with the driven unit (see FIGURES 8 and 9). This prevents tooth wear between the driven unit and the idler unit not lying in a position of correct mesh at any instant.

Figure 8:
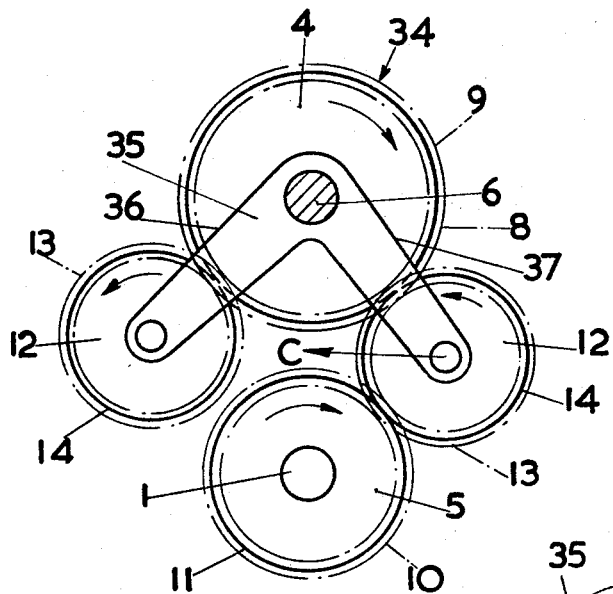
FIGURES 8 and 9 are views similar to FIGURE 2 of a second embodiment showing different relative positions of units of a reversible gear train assembly.
Figure 9:
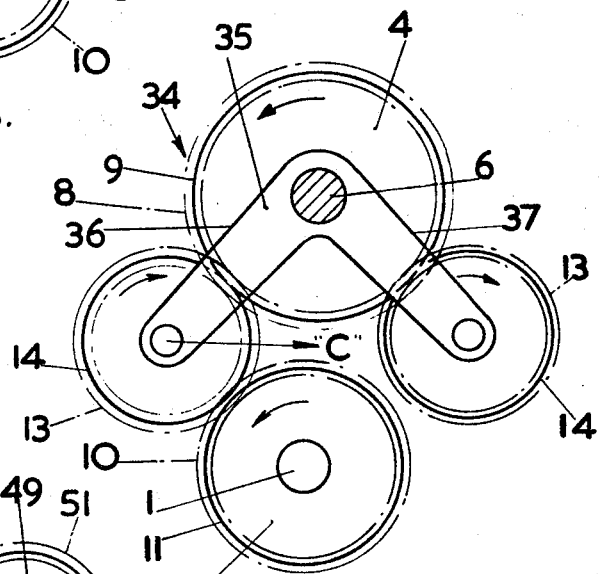

In use of the mill, when the driven unit 4 is driven in the clockwise direction of rotation as viewed in FIGURE 8, the idler unit mounted upon arm 37 lies in correct tooth mesh with the driving and driven units to transfer the drive to the driven unit. When the driving unit is driven in the anticlockwise direction (FIGURE 9) to reverse the rotational direction of the mill rolls, the resultant force C on the teeth of the idler unit upon arm 37 is reversed thereby urging this idler unit out of mesh with the driven unit by rotation of the bellcrank lever about the shaft 6. Further movement of the bellcrank lever in the same direction is effected because of its frictional engagement with the shaft to move the idler unit on arm 36 into correct mesh with the driving and driven units. This idler unit is then held in this position during continued drive in the same direction by the resultant force C acting along the path shown in FIGURE 9.

The gear train assembly of the second embodiment has the advantages detailed above for the assembly described in the first embodiment, but in addition, it also allows for reversal of drive from the driving to the driven units.

In a third embodiment, a gear train assembly 38 (FIGURE 10) incorporates a single idler unit 12 while allowing the distances between driving and driven units 4 and 5 to be varied and also while allowing the reversal of drive of the unit 4 to reverse the direction of rotation of the unit 5.

In this embodiment, means for preventing or restricting movement of the idler unit to move its teeth out of correct mesh with the driving unit comprises an arm 39 which is pivotally mounted about an axis coinciding with the rotational centre of the driving unit upon the driving shaft 6. The arm is frictionally connected to the driving unit by its frictional engagement with the shaft 6 so that the arm is urged to pivotally move in the same direction as the direction of rotation of the shaft. In use, while the driving unit 4 is rotating in the clockwise direction shown by the full outlined arrow in FIGURE 10, the idler unit is located in correct mesh (in full outline position shown) with the units 4 and 5. If the driving unit is then driven in the reverse direction, that is in the direction of the chain-dotted arrow in FIGURE 10, the arm 39, by virtue of its frictional contact with the shaft 6, is pivotally moved around the driving unit in the anticlockwise direction to move the idler unit out of its full outlined correct mesh position on one side of the driving and driven units to a correct mesh position with these two units on the other side of the units as shown by the dotted outline. If the driving unit is then driven again in the clockwise direction, the arm 39 is moved by friction also in the clockwise direction to return the idler unit to its correct mesh position shown in full outline.

Figure 11:
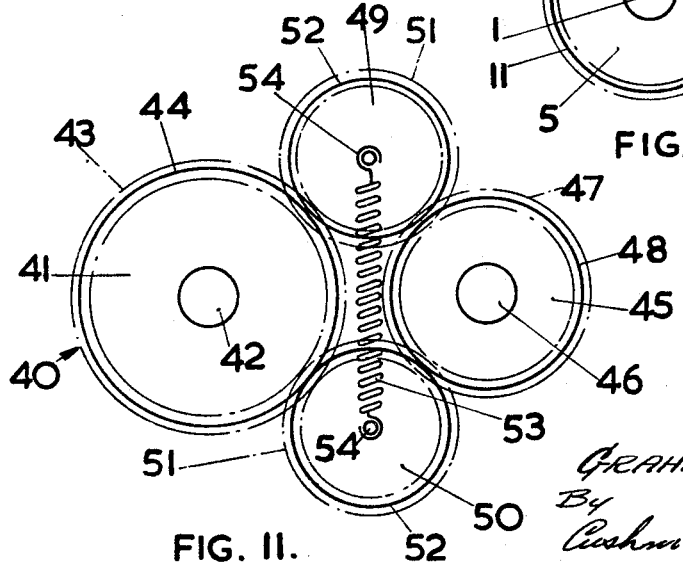
FIGURE 11 is a diagrammatic axial end view of a gear train assembly forming a fourth embodiment.

In a fourth embodiment shown in FIGURE 11, a reversible drive gear train assembly 40 for driving a mechanism comprises a driving unit 41 secured to a driving shaft 42 and being of similar construction to the unit 4 of the first embodiment in that it comprises a gear wheel 43 flanked on its two sides by coaxial integral spacers 44. A driven unit 45 secured to a driven shaft 46 and having a gear wheel 47 with coaxial integral spacers 48, is drivably connected to the unit 41 by idler units 49 and 50 disposed one on each side of a line passing through the axes of rotation of the units 41 and 45. The units 49 and 50 have gear wheels 51 of equal pitch circle diameter, each gear wheel being flanked on its two sides by coaxial integral spacers 52. In each of the gear wheel units of the assembly, the diameter of each spacer is equal to the pitch circle diameter of the gear wheel. The two units 49 and 50 are urged towards each other by tension springs 53 located one at each side of the units and secured at their ends to coaxial pins 54 of the units. The springs are resilient means forming idler unit movement preventing or restricting means. The units 49 and 50 are otherwise freely movable in a radial direction relative to the units 41 and 45.

In use of the assembly, when the driving unit 41 is rotated in a clockwise direction to drive the driven unit 45, the drive is imparted to unit 45 by the unit 49 which is held with its gear teeth in correct meshing engagement with the gear wheels 43 and 47 by a resultant force, as described in the first embodiment. The drive forces imposed upon the unit 50 have a resultant force which urges the unit 50 away from and to move its teeth out of mesh with the gear wheels 43 and 47. However, the unit 50 is held with its gear teeth in mesh with the gear wheels 43 and 47 by the springs 53.

Upon driving the unit 41 in the anticlockwise direction to drive the unit 45 in the same direction, the idler unit 50 imparts the drive to the unit 45 and is held with its teeth in correct meshing engagement with the gear wheels 43 and 47 by a resultant force urging the unit 50 towards the units 41 and 45. In this instance of anticlockwise rotation of the unit 41, the unit 49 is urged away from the units 41 and 45 but is retained in position by the springs 53.

It will be appreciated that in use, the gear train assembly of the fourth embodiment has all the advantages for that described in the second embodiment except that the distances between centres of the driving and driven units cannot be varied while drive is taking place as the opposing in-mesh idler gear wheels lock the positional relationship of the centres of the driving and driven units.

In a fifth embodiment in which the size of gear wheels required to give a desired gear ratio for driving a mechanism cannot be accommodated in one plane because of insufficient distance between the driving and driven shaft centres, the following construction is used as shown in FIGURES 12, 13 and 14.

In the fifth embodiment, a gear train assembly comprises a driving unit 55 comprising a gear wheel element consisting of two gear wheels 56 (FIGURES 13 and 14) which are coaxially secured to a driving shaft 57 and are spaced-apart by a sleeve 58. The gear wheels are of equal pitch circle diameter and each wheel is provided with a spacer 59 which is coaxially formed with the wheel on its side remote from the other wheel, the diameter of the spacers being equal to the pitch circle diameter of the gear wheels.

A driven unit 60, as is particularly shown in FIGURE 14, comprises a driven gear element consisting of a wheel 61 secured to a driven shaft 62, the gear wheel 61 lying partly between the gear wheels 56. The unit 60 is provided with two spacers 63 which are coaxially secured to the shaft 62 and are separated from the gear wheel 61 by sleeves 64 so that each gear wheel 56 and its spacer 59 lies partly between a spacer 63 and the gear wheel 61. The spacers 63 have diameters equal to the pitch circle diameter of the gear wheel 61.

An idler unit 65, which is freely movable radially of the other units, has a gear wheel 66 (see particularly FIGURE 13) which is of sufficient axial length to bridge the gap between and mesh with the gear wheels 56. The gear wheel 66 also meshes with the gear wheel 61. The unit 65 is also provided with two spacers 67 which are coaxially formed with the gear wheel 66 and flank the gear wheel. These spacers have a diameter equal to the pitch circle diameter of the gear wheel 66 and are of sufficient axial length to engage the peripheral surfaces of the spacers 59 and 63. Each of the units is symmetrical about a mid-circumferential plane of the unit so that no out-of-balance forces are imparted upon the idler unit to dislodge this unit out of its correct position during use.

In use of the gear train assembly during rotation of the driving and driven units in a clockwise direction in FIGURE 12, the idler unit is urged towards the other units by a resultant force, as described in the first embodiment, so that the spacers 67 are held in peripheral engagement with the spacers 59 and 63 whereby the gear wheel 66 is maintained in correct meshing engagement with the gear wheels 56 and 61.

In a modification of the fifth embodiment, the gear wheels 56 are provided with a single spacer (not shown) instead of the spacers 59. This single spacer lies between the gear wheels 56 to space them apart and thus replaces the sleeve 58. The modified gear wheel unit 55, of course, necessitates corresponding modification to each of the other units 60 and 65 to ensure correct meshing of the gear wheels and engagement of the spacers.

In a sixth embodiment as shown in FIGURES 15 and 16, a gear train assembly 68 suitable for a crane drive, comprises a driven unit 69 in the form of an annulus with a gear wheel element as a single wheel 70 having internal gear teeth. Integrally formed spacers 71 are provided one on each side of the gear wheel. A driving unit 72 is located radially and axially, but eccentrically, within the driven unit, and is drivably connected to the driven unit by an idler gear wheel 73. The units 72 and 73 are provided, respectively, with gear wheels 74 and 75 and spacers 76 and 77 disposed coaxially one at each side of the gear wheels. In each unit the diameter of the spacers coincides with the pitch circle diameter of the gear wheel. The driving unit is drivable by a driving shaft 78 (FIGURE 16). The units are relatively disposed so that when the gear wheels are in correct mesh, an angle produced between one line connecting rotational centres of the idler unit and driving unit 72 and an extension of another line connecting rotational centres of the idler unit and the driven unit 69 is at least twice the pressure angle.

In use of the assembly, the driving wheel is rotated in the clockwise direction as shown in FIGURE 15 to rotate the driven unit anticlockwise. Because of the relative disposition of the units, a resultant force C of the driving forces, acting upon the idler unit 73 in the direction indicated in FIGURE 15 holds the idler unit in correct mesh with the other units while drive is being imparted to the driven unit in the direction indicated.

The gear train assembly of the sixth embodiment is not reversible in use but otherwise has the advantages of the assemblies described in the above embodiments. In this embodiment, one particular advantage is that the driving unit is mounted eccentrically and may move radially with respect to the driven unit so long as the force C still acts upon the idler unit to hold it in position. The need is, therefore, avoided for accurate location of the driving unit relative to the driven unit such as is required in concentric conventional gear drive assemblies incorporating an internally toothed annular gear.

In a modification of the sixth embodiment (not shown), a second idler unit is also used, the two idler units being mounted upon the arms of a bellcrank lever pivoted upon shaft 78 in a similar manner to the mounting upon shaft 6 in the second embodiment. The assembly is then reversible in operation.

In a further modification of the sixth embodiment (not shown), the driven unit 69 is replaced by an annular unit which is a driving gear to drive the unit 72 which now becomes the driven gear. The annular driving gear differs from the unit 72 only in that it is provided with external gear teeth in addition to its internal teeth, the external teeth being drivably connected to a driving wormwheel.

Gear train assemblies according to the invention and as described in the embodiments may be used in other mechanical devices or machines while obtaining the advantages mentioned above. For instance, gear train assemblies according to the invention may be used in lathe or machine tool gearing; or in gear boxes in which many gear ratios are provided so that drive shafts are particularly long in which case deflection of the shafts is normally a major factor causing gear wear or noise because of incorrect gear meshing. For the reasons given in the first embodiment, with the use of gear train assemblies according to the invention, correct gear wheel meshing is achieved regardless of shaft deflections and also of bearing wear.

A further important use of gear train assemblies according to the invention is for the driving of chucks of the drill heads or nut runners of a multiple machine, each chuck being driven by an adjacent chuck by a gear train assembly. Such a system allows for the changing of the centre distances of the chucks and for the changing of gear ratios without the use of universally jointed shafts. Further, gear train assemblies may, for instance, be used in positive drives in small mechanisms in which it is particularly desirable that there is no need for a fixed mounting shaft and bearing for the idler gear because of space limitations. The gear wheel units may in such mechanism be made, for instance, in rubber or plastics instead of metal.

I claim:

1. A gear train assembly comprising a driving gear wheel, a driven gear wheel, and an idler gear wheel for drivably connecting the driving and driven gear wheels wherein the improvement comprises at least one coaxial cylindrical spacer for each of the gear wheels, the idler gear wheel and associated spacer are movable radially with respect to one at least of the other gear wheels and its respective spacer, the spacer of the idler gear wheel lying in engagement with the spacers of the other gear wheels when the idler gear wheel is in correct mesh with those of the other gear wheels, and the gear wheels being disposed relatively to one another during driving of the gear wheels to apply a resultant driving force to the idler gear wheel along a path between the rotational centres of the other gear wheels to hold the idler gear wheel constantly in correct mesh with the other gear wheels.

2. An assembly according to claim 1 wherein the driving and driven gear wheels are movable relative to one another to adjust the distances between their rotational centres.

3. An assembly according to claim 2 including means operatively connected to one at least of the gear wheels for preventing or restricting movement of the idler gear wheel out of correct mesh with the driving gear wheel when said resultant force is not applied.

4. An assembly according to claim 3 wherein the movement preventing or restricting means comprises a resilient means operatively connected to the idler gear wheel to hold it in a position in which it is in continuously correct meshing engagement with the driving gear wheel.

5. An assembly according to claim 3 wherein the idler gear wheel is an annulus having gear teeth on an external surface of the annulus, and the movement preventing or restricting means comprises an abutment member extending through the annulus in a position to engage the idler gear wheel to prevent sufficient movement of the idler gear wheel away from the driving gear wheel completely to disengage the two gear wheels.

6. An assembly according to claim 3 wherein the movement preventing or restricting means comprises an abutment member opposing the idler gear wheel in a position to engage the idler gear wheel to prevent sufficient movement of the idler gear wheel away from the driving gear wheel completely to disengage the two gear wheels.

7. An assembly according to claim 3 wherein the movement preventing or restricting means comprises an endless member and each of the driving and driven gear wheels is provided with a coaxial cylindrical extension having an outer peripheral surface around which the endless member extends and lies in frictional engagement to prevent relative rotational slippage of the driving and driven gear wheels.

8. An assembly according to claim 3 wherein the movement preventing or restricting means comprises an arm pivotally mounted about an axis coinciding with the rotational axis of the driving gear wheel, the idler gear wheel being rotatably mounted upon the arm at a fixed distance from the pivotal axis, said arm being frictionally connected to the driving gear wheel and pivotally movable by the driving gear wheel during reversal in its rotation to move the idler gear wheel from a position on one side of the driving and driven gear wheels, around the driving wheel, and to a position on the opposite side of said gear wheels and permit the assembly to drive alternatively in both directions.

9. An assembly according to claim 1 including first and second gear wheels disposed one on each side of a line connecting the rotational centres of the driving and driven gear wheels, the gear wheels being disposed relatively to one another during rotation of the driving gear wheel alternatively in one direction and in the opposite direction to apply a resultant driving force, respectively, alternatively to the first and second gear wheels along a path between the rotational centres of the driving and driven gear wheels to hold the first and second idler gear wheels constantly in correct mesh with the driving and driven gear wheels, means associated with the gear wheels being provided for preventing or restricting movement of each idler gear wheel out of correct mesh with the driving gear wheel when said resultant force is not applied along said path.

10. An assembly according to claim 9 wherein the movement preventing or restricting means comprises a bellcrank lever pivotally mounted about an axis coinciding with the rotational axis of the driving gear wheel, and the idler gear wheels are rotatably mounted one on each arm of the lever, the distance between the two idler gear wheels ensuring that when one of the idler gear wheels is in correct mesh with the driving and driven gear wheels, the other idler gear wheel is completely out of mesh with the driven gear wheel, and the lever is frictionally connected to the driving gear wheel to pivotally move the lever upon reversal of rotation of the driving gear wheel to move one idler gear wheel out of mesh with the driven unit and to move the other idler gear wheel into mesh with driven gear wheel.

11. An assembly according to claim 9 wherein the movement preventing or restricting means is a resilient means extending from one idler gear wheel to the other.

12. An assembly according to claim 1 wherein the gear wheels have a pressure angle, each gear wheel has an outer peripheral surface formed with gear teeth, and the gear wheels are relatively disposed to produce an angle between one line connecting rotational centres of the idler gear wheel and the driving gear wheel and another line connecting rotational centres of the idler gear wheel and the driven gear wheel, said produced angle being at least twice the pressure angle.

13. An assembly according to claim 1 wherein the gear wheels have a pressure angle, one of the driving and driven gear wheels is an annulus having an inner peripheral surface formed with gear teeth, and the gear wheels are relatively disposed to produce an angle between one line connecting rotational centres of the idler gear wheel and the non-annular driving or driven wheel, and an extension of another line connecting rotational centres of the idler gear wheel and the annulus, said produced angle being at least twice the pressure angle.

14. An assembly according to claim 1 wherein each spacer has a diameter equal to the pitch circle diameter of its respective gear wheel.

References Cited

UNITED STATES PATENTS

| | | | |
|---|---|---|---|
| 643,940 | 2/1900 | Brooks et al. | 74—410 |
| 3,202,006 | 8/1965 | Lewellen | 74—406 |
| 3,216,270 | 11/1965 | Nasvytis | 74—410 |

FRED C. MATTERN, JR., *Primary Examiner.*

LEONARD H. GERIN, *Assistant Examiner.*